Sept. 8, 1936.   L. GURRIERI ET AL   2,053,523
KNURLING MACHINE
Filed Aug. 19, 1933   2 Sheets-Sheet 2
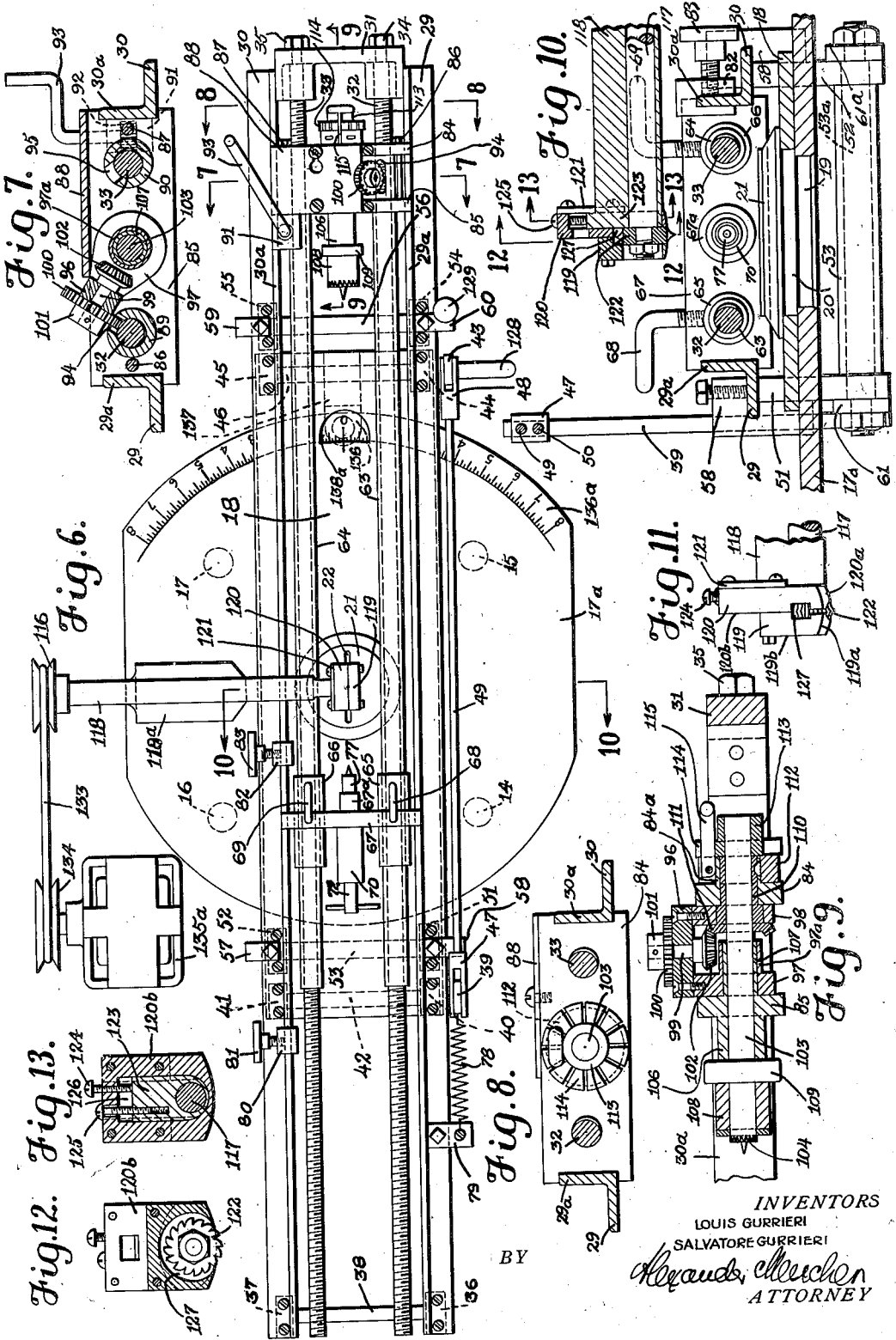
INVENTORS
LOUIS GURRIERI
SALVATORE GURRIERI
BY
ATTORNEY Patented Sept. 8, 1936

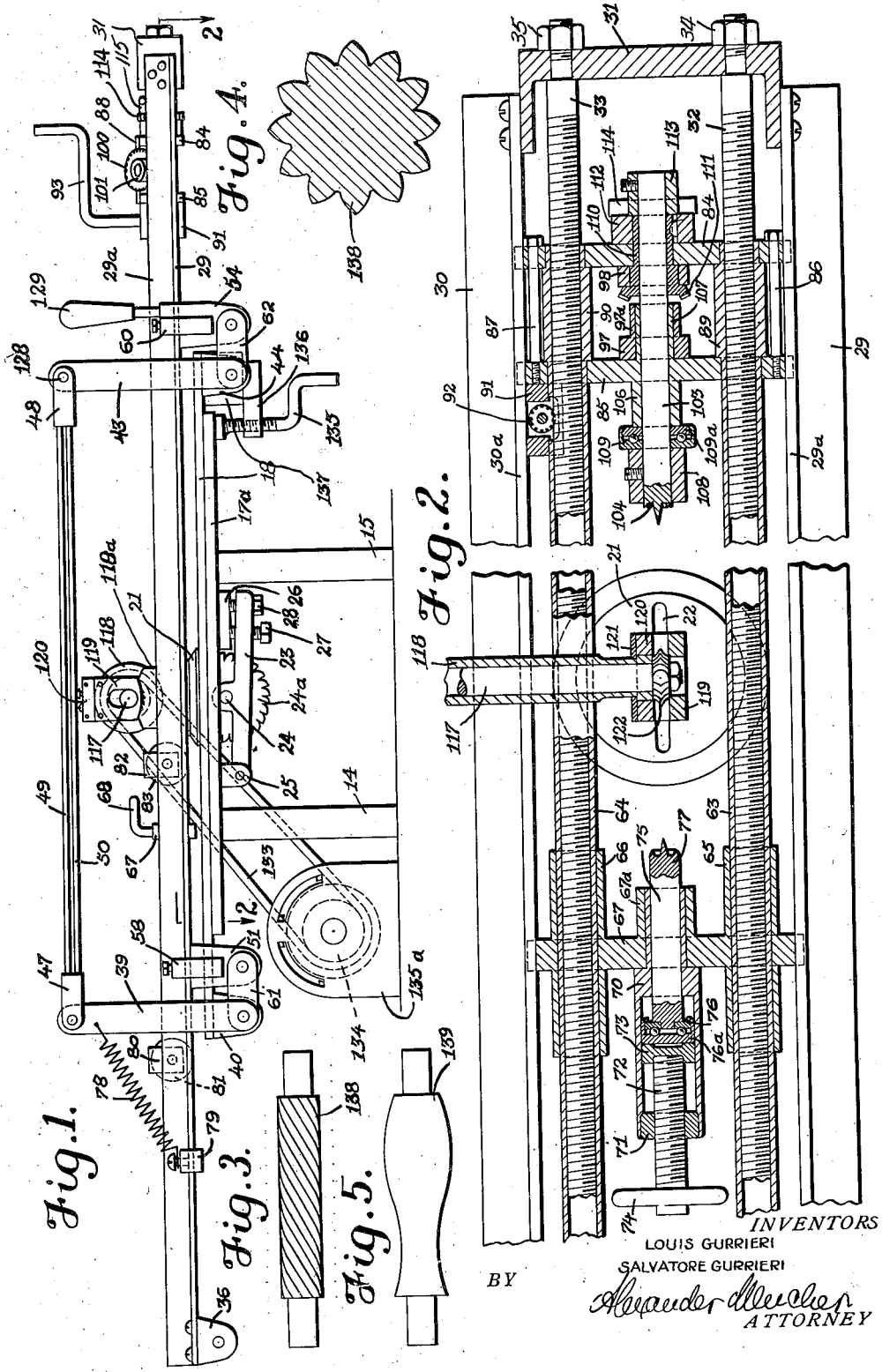

2,053,523

UNITED STATES PATENT OFFICE 2,053,523

KNURLING MACHINE

Louis Gurrieri and Salvatore Gurrieri,
Canarsie, N. Y.

Application August 19, 1933, Serial No. 685,832

2 Claims. (Cl. 142—26)

This invention relates to fluting and knurling machines and more specifically to a knurling machine provided with improvements in a vertically adjustable and traveling lathe carriage.

The main object of the invention is to provide a fluting and knurling machine wherein the improvement resides in the simplicity of structure, compactness, lightness in weight and ease of operation.

A further object of the invention resides in the provision of a vertically adjustable lathe carriage sensitive to pressure on a hand lever.

Another object of the invention resides in the provision of a fluting and knurling machine wherein the lathe elements are constructed in a novel manner to cooperate with the lathe carriage.

Another object of the invention resides in the provision of a traveling and vertically adjustable lathe carriage which is rotatable in conjunction with the carriage frame.

A further object of the invention is the provision of a fluting and knurling machine wherein a traveling and vertically adjustable lathe carriage and lathe are respectively advanced and rotated simultaneously towards fixed revolving cutters.

These objects and other incidental ends and advantages will appear hereinafter in the progress of the disclosure.

Accompanying the specification herein and forming part thereof are drawings showing a preferred form of the invention wherein corresponding reference characters designate corresponding parts throughout the several views thereof.

Figure 1 is a side elevational view of our improved fluting and knurling machines.

Figure 2 is a sectional and plan view of Figure 1 through the line 2—2.

Figure 3 is an elevational view of a specimen of wood provided with parallel spirals cut out by the use of said machine.

Figure 4 is a cross-sectional view of Figure 3.

Figure 5 is a blank to be operated upon, showing an irregular longitudinal surface which may be operated upon by the improved vertically adjustable lathe carriage to effectuate spiral grooves as in Figure 3.

Figure 6 is a top plan view of Figure 1.

Figure 7 is a cross-sectional view of Figure 6 along the line 7—7 thereof.

Figure 8 is a cross-sectional view of Figure 6 along the line 8—8 thereof.

Figure 9 is a longitudinal sectional view of Figure 6 along the line 9—9 thereof.

Figure 10 is a central cross-sectional view of Figure 6 along the line 10—10 thereof.

Figure 11 is a side elevational view of the adjustable holder for the fixed revolving cutter.

Figure 12 is a front sectional view of Figure 10 along the line 12—12 thereof.

Figure 13 is a front sectional view of Figure 10 along the line 13—13 thereof.

In accordance with the invention and in accordance with the preferred form thereof as embodied in the above described views, the fluting and knurling machine is provided with a base support comprising a stand having vertical supports 14, 15, 16 and 17 and a flat and circular table element 17a surmounting said vertical supports.

18 designates a longitudinal supporting body for the vertically adjustable carriage frame hereinafter to be described, and is pivotally connected to the flat circular table element 17a by means of a connecting and bearing head comprised of fastening portion 19 affixed through the center of circular table element 17a bearing portion 20 penetrating the longitudinal supporting body 18 and cap member 21 surmounting the said bearing portion 20 and resting on the upper surface of 18.

22 designates a longitudinal slit along a diameter of cap member 21 and is adapted to receive a revolving cutter 24a journalled at the underside of flat circular table element 17a. The said revolving cutter 24a is adjustably fixed in a position by means of two parallel bars 23 between which the said revolving cutter 24a is journalled, the said bars being pivotally attached to a depending lug 25. The parallel bars 23 at the extremities thereof are vertically adjustable by means of screws 27 and 28 penetrating the said bars 23 and being in threaded engagement with a receiving lug 26 attached to the underside of flat circular table element 17a. By the adjustment of screws 26 and 27 the position of revolving cutter 24a above or below the upper surface of cap member 21 is effectuated.

The main feature of the invention herein comprising a rotatable, vertically adjustable and traveling lathe carriage in conjunction with a rotatable and vertically adjustable lathe frame will now be described.

The lathe frame comprises preferably two longitudinal and parallel angle irons 29 and 30, the upwardly extending flanges 29a and 30a thereof serving the functions hereinafter to be described.

Reference characters 31 and 38 represent end pieces for the said angle irons 29 and 30, end piece 38 being journalled between depending lugs 36 and 37, while end piece 31 is affixed to flanges 29a and 30a. 32 and 33 are two parallel, longitudinal and threaded rods disposed between angle irons 29 and 30 and affixed to end piece 31 by the ordinary means such as nuts 34 and 35, the said rods serving as the rack element for the horizontal propulsion of the lathe carriage hereinafter to be described.

The above-described lathe frame is vertically and delicately adjustable toward and away from independently operable revolving cutters such as 24a projecting from below the lathe frame or 122 projecting from above the lathe frame. This adjustability is accomplished by the pivotal support of the lathe frame about the longitudinal supporting body 18, the structure therefor now to be described. 39 and 43 represent a set of standards vertically disposed adjacent to and on the outerside of angle iron 29, the said standard at the upper extremities thereof being pivotally connected to longitudinal bars 49 and 50 by means of pivot heads 47 and 48. Depending upon and affixed to the underside of longitudinal supporting body 18 and adjacent the transverse ends thereof are two sets of lugs, 40 and 41 having axis 42 journalled therebetween, and 44 and 45 having axis 46 journalled therebetween. Standards 39 and 43 at the lower extremities thereof are pivotally connected to axes 42 and 46 respectively. Angle irons 29 and 30 of the lathe frame, as in the case of longitudinal supporting body 18, are provided with two sets of depending lugs 51 and 52 having axis 53 journalled therebetween, and 54 and 55 having axis 56 journalled therebetween. Axes 53 and 56 are spaced preferably to the forward side of axes 42 and 46.

Keyed to standards 39 and 43 at the lower extremities thereof are horizontal radius bars 61 and 62, the outer ends of said radius bars being pivotally connected to axes 53 and 56 respectively. Extending horizontally from pivot head 48 is an operating lever 128 which, in accordance with the aforementioned description, raises the lathe frame vertically and upwardly by extending forward pressure, and downwardly by extending opposite pressure. Means are provided also for the automatic raising and lowering of the lathe frame. Such means comprise a coiled spring member 78 affixed to angle iron 29 at one end by means of binding post 79 and at the other end to the upper portion of standard 39. Spring 78 naturally tends to raise the lathe frame, while the differential diameter of the specimen to be fluted and knurled pressing against the upper revolving cutter effects automatic lowering adjustability. Of course, an opposite direction of tension of spring 78 can effectuate a lowering of the lathe frame while the differential diameter of the specimen to be fluted and knurled pressing against the lower revolving cutter effects automatic raising adjustability, Sets of depending lugs 51, 52 and 54, 55 affixed to angle irons 29 and 30 are provided with clamps 58, 57, 60 and 59 for provisional attachment to angle irons 29 and 30 during the process of assemblage. Clamp 60 is additionally provided with an upwardly extending handle 129 serving as a support for the hand when manipulating lever 128.

The traversing or travelling lathe carriage and lathe proper are now to be described. The said carriage utilizes as tracks threaded rods 32 and 33, and the upwardly extending flanges 29a and 30a of angle irons 29 and 30, the said carriage comprising essentially tubes 63 and 64 ensleeving threaded rods 32 and 33. At one end of tubes 63 and 64 is provided the tail stock assembly and embodies details per se and in conjunction with the remaining structure which are features of the invention herein and which are now to be described. Plate 67, as best shown in Figures 2 and 10 of the accompanying drawings has provided therein in horizontal alignment three apertures, the end apertures having tubular elements 65 and 66 extending from both sides of the said plate 67, while the central aperture has a tubular element 67a extending from the inner face of plate 67 and a tubular element 70 extending from the outer face of plate 67. The vertical edges of plate 67 are excavated intermediate the height thereof to permit sliding movement along 29a and 30a for the tail stock assembly. The tubular elements 65 and 66 of plate 67 are adapted to slide along and ensleeve tubes 63 and 64 respectively. 67a is adapted to serve as a bearing of a dead spindle 75 with which is mounted a chuck 75 for centering and holding one end of the blank or specimen to be fluted and knurled; while 70 is a housing for the tightening and loosening of the said dead spindle 75, the said tightening and loosening being accomplished by a screw 72 penetrating housing 70 through threaded bushing 71 and abutting a slidable ring member 73 within housing 70. Slidable ring member 73 in turn abuts end bearing 76a for spindle 75. By manipulating handle 74 of screw 72, dead spindle 75 can be actively advanced or indirectly retarded.

Since the tail stock assembly is designed to move with tubes 63 and 64 on which the said stock is mounted, provision is made for the independent movement of the tail stock assembly along tubes 63 and 64 for the adjustment of a blank or specimen between the tail and head stocks. For such purpose, plate 67 is provided with vertical orifices from the upper edge above the end apertures and extending to and communicating with the said apertures. The said orifices are internally threaded and are adapted to receive in threaded engagement therewith levers 68 and 69. Upon the tightening of said levers 68 and 69, the tail stock assembly is affixed to the carriage tubes 63 and 64. Upon the loosening of the said levers 68 and 69, the tail stock assembly may be moved backwardly and forwardly upon tubes 63 and 64.

The head stock assembly of the lathe proper is now to be described and embodies details per se and in conjunction with the remaining structure which are features of the invention herein. 84 and 85 constitute parallel and similar plates spaced apart and connected together by any ordinary means such as bolts 86 and 87. As shown in Figure 7 of the accompanying drawings, each of the said plates is provided with three apertures disposed along the width thereof, the plates 84 and 85 being affixed to tubes 63 and 64 by means of expansions 89 and 90 of the said tubes penetrating the end apertures. The vertical edges of plates 84 and 85, like plate 67 of the tail stock assembly are excavated intermediate the height thereof to permit sliding movement along 29a and 30a for the head stock assembly. Passing through the central apertures of plates 84 and 85 is the live spindle 103 with which chuck 104 is associated. Live spindle 103 cooperates with a keyed bevel gear which serves to rotate spindle 103. The said bevel gear, designated by reference character 111 is affixed to cylindrical jacket 110, the reduced portion of the said jacket 110 utilizing as part of its bearing the central aperture of plate 84. 98 is an auxiliary collar for the shoulder portion of cylindrical jacket 110, the said collar 98 being disposed adjacent the inner face of plate 84, while 112 is a collar disposed adjacent the outer face of plate 84. The said collar 112 is keyed to the cylindrical jacket as best shown on Figure 2 of the accompanying drawings. Cap member 113 is mounted on the end of live spindle 103 and is provided with ring 114 abutting the outer edge of collar 112. The said cap member 113 is keyed to live spindle 103 to rotate with the same. Collar 112 is provided with a pivoting lever 115 which engages with any one of a series of radial notches situated at the circumference of ring 114, the purpose of the said lever engaging the radial notches to be hereinafter set forth.

Plate 85 is provided with tubular bearing elements extending from both sides of the central aperture thereof, element 107 extending from the inner face of plate 85, while element 106 extends from the outer face of plate 85. As just mentioned, 106 and 107 perform the usual bearing surface functions for live spindle 103, sleeve 97 and its reduced portion 97a surrounding tubular bearing element 107 for the known reinforcing purposes. Ball bearing element 109a, affixed to and abutting the edge of tubular bearing 106 is engaged by a chuck 108, the said chuck being keyed to live spindle 103 and being engaged rotatably to ball bearing element 109a by means of a bearing ring 109.

In order to effectuate movement of the lathe elements comprising the tail and head stocks between which the specimen to be fluted and knurled is held, tubular elements 63 and 64 must be propelled along threaded rods 32 and 33, and simultaneously therewith live spindle 103 must be rotated so that spiral grooves may be cut out of the said specimen as the latter in its movement toward the independently revolvable cutters 122 or 24a is subjected thereto.

A feature of the invention herein is provision of gearing means whereby operation of a single gear efficiently and simply causes rotation of live spindle 103 of the head stock simultaneously with lateral movement of the lathe proper. By disconnection or unmeshing of the gear elements, the rotation of the live spindle can be done away with at the same time retaining the propulsion of the lathe proper or the carriage on which the head and tail stocks are affixed, for the effectuation of straight and parallel grooves on the specimen.

The abovementioned gearing means are now to be described. 91 represents a housing affixed to the outer face of plate 85, the said housing containing a mounted pinion 92 communicating and engaging with threaded rod 33 through an opening in tube 64 as best shown in Figure 2 of the accompanying drawings. Pinion 92 is operated either by an electrically driven belt, or as shown, by a crank lever 93. The turning of the crank lever 93 effectuates movement of the lathe carriage and the lathe proper to which the latter is affixed as has hereinbefore been described. Between plates 84 and 85 is mounted a vertically disposed shaft 99 having a spur wheel 100 mounted on the top thereof and keyed thereto by a superposing crown element 101, while at the bottom of said vertical shaft 99 is a bevel gear 102 engaging with bevel gear 111. The mounting of shaft 99 is accomplished by the provision of plate 96 having a central aperture to serve as the guide for the same, the said plate 96 being affixed to the upper and flattened portions of sleeve 97 and collar 98 as best shown in Figure 9 of the accompanying drawings. It is thus seen that vertical shaft 99 may be swung rotatably to either side of the axis of live spindle 103. The purpose of such provision is to enable spur wheel 100 to engage threaded bar 32 or 33 through slits 94 or 95 of expansions 89 and 90 respectively of tubes 63 and 64. The engagement of spur wheel 100 with threaded bar 32 will cause live spindle 103 to rotate in one direction, while the engagement of said spur wheel 100 with threaded bar 33 will cause live spindle 103 to rotate in the opposite direction. It is seen how the engagement of pinion 92 with threaded bar 33 causes movement of the lathe carriage and simultaneously therewith rotation of live spindle 103 in either predetermined direction. The change in the direction of rotation of live spindle 103 is a very significant part of the invention insofar as the same is responsible in conjunction with the rotation of flat circular table element for the formation of opposite spirals to give a knurling effect to the specimen operated upon. As will hereinafter appear, by changing the obliqueness or angle of the revolving cutters, the necessity for the rotation of flat circular table element 17a is eliminated. For purposes of description, however, 135 represents a clamp member frictionally engaging table element 17a with longitudinal supporting body 18 through the medium of lugs 136 and 137 emanating from the said body 18, the said clamping means being described as merely expeditious.

Independently revolving cutter 122 is mounted above and oblique to the axis of the specimen desired to be fluted and knurled, and its direction of rotation is toward the advancing lathe carriage carrying the specimen to be operated upon. 118a represents a base affixed preferably to flat circular table element, and mounted on the top thereof is a bearing cylinder 118 for driving shaft 117 of the cutter. Cutter 122 is driven by means of pulley 134 attached to the shaft of a motor in motor housing 135a, the said pulley being in engagement with pulley 116 of driving shaft 117 by means of belt 133, all as best shown in Figure 1 of the accompanying drawings. Lower cutter 24a heretofore described is driven by the ordinary means similar to those described above, the driving means not being shown on the drawings herein.

Cutter 122 is provided with an adjustable setter to regulate the thickness of the spiral grooves cut in the specimen operated upon. Such adjustability is another feature or element of the invention and is now to be described. 119 and 120 are two cooperating enclosing pieces for cutter 122 and comprise the housing therefor. The bottom edges of 119 and 120 are arched along the length thereof and arched along the width also as shown in Figure 11 and indicated by numerals 119a and 120a. 126 indicates open spacing between enclosing pieces 119 and 120 to permit free rotation of cutter 122, while the bottom edges of the enclosing pieces provide an opening intermediate the length thereof to permit the teeth of cutter 122 to project therefrom to operate on the specimen to be fluted and knurled. Enclosing piece 119 comprises the front element of the adjustable setter, and is made up of a face plate rectangular preferably with a curved or arched lower edge. A continuous flange is provided around the perimeter of the said face plate, the flange on the lower edge intermediate the length thereof being excavated adjacent the free edge, the said flange being designated by numeral 119a. The flange along the side edges of face plate 119b below the median portion thereof is also excavated. Rear enclosing piece 120 is made up of a face plate 120b to which the front enclosing piece is affixed by any means such as screw attachment. Face plate 120b, as shown in Figure 11 of the accompanying drawings projects above 119b. The said face plate 120b is similarly provided with a continuous flange around the perimeter thereof so that a housing is effectuated when the enclosing pieces 119 and 120 are connected together. The flange on the lower edge of plate 120b and on the side edges thereof are similarly excavated as in the case of plate 119a as best shown in Figure 11 of the drawings herein. The aforedescribed adjustable setter is mounted on a shoulder 123 of the bearing cylinder 118 for driving shaft 117 of the cutter. The said mounting is accomplished by fitting plate 120b on shoulder 123 as seen in Figure 13, and closing the rear opening by affixing the plate member 121 to the edges of the flange from plate 120b. The flange of plate 120b along the upper edge thereof is provided with two downwardly extending orifices penetrating the thickness of the said flange, one of these orifices being threaded. Screw 124 engages the threaded orifice while screw 125 passes through the unthreaded orifice. Screw 125 engages shoulder 123 through a threaded orifice therein as seen in Figure 13. By withdrawing screw 125 partially so that the head thereof projects above the upper flange of plate 120b, screw 126 by a tightening thereof will cause plate 120b to rise thereby effectuating a raising of the housing above the teeth of cutter 122. To lower the housing with respect to cutter 122, screw 125 is tightened to penetrate the female screw of shoulder 123 while at the same time screw 124 is loosened.

In using the fluting and knurling machine, the subject matter of the invention herein, the tail stock is first adjusted to the length of the blank or specimen by loosening levers 68 and 69, thereby permitting the same to be slidable along the carriage or tubes 63 and 64. The appropriate distance is thus obtained between the tail stock and the head stock. Levers 68 and 69 are now tightened and the specimen is finally fixed between the spindles of the lathe proper by lever 72 as has before been described in the consideration of the tail stock assembly. By rotation of pinion 92 electrically or through the turning of bell crank lever 93, the lathe carriage with the lathe elements thereon is advanced toward the revolving cutter 122 or 24a, while at the same time rotary movement is given to the specimen to be fluted and knurled. Provision is made for the stoppage or limit of the advancing carriage depending on the length of the specimen by the expedient of an adjustable slide 80 on angle iron 30 manipulated by a set screw 81. The number of spirals made on a specimen by the cutter throughout the length of said specimen depends upon the number of complete revolutions of the specimen while advancing its own length past the cutter. This is of course controllable by varying the size of the spur wheel 100. After a specimen has traversed the cutter its full length a single and continuous spiral is made therein. The specimen is then withdrawn from its advanced position, at the same time lowering the adjustable lathe frame away from cutter 122 or raising the lathe frame away from alternate cutter 24a by means of lever 128. The return movement of the specimen is effectuated by a reversal in the direction of movement of bell crank lever 93. Moreover slidable stop 82 on angle iron 30 and adjusted by screw 83 controls the return limiting position of the specimen. In order to effectuate a similar parallel spiral on the specimen, the blank must be revolved the desired distance before it is again advanced to the cutter. The number of spirals can be predetermined by choosing a specific number of notches on ring 114 spaced in any arbitrary fashion from each other. Every time a continuous spiral is made and the specimen returned to its original position, pivoting lever 115 is set into place in the adjoining notch. Figure 3 shows a specimen 138 which is provided with parallel spirals throughout its circumference. Figure 5 shows a blank specimen with irregular diameters and which can be fluted in the identical fashion as specimen 138 by virtue of the vertically adjustable lathe frame which automatically and manually is raised and lowered by lever 128 to and away from the cutter teeth to take care of the differential diametrical surface.

By virtue of the structure of the machine herein, the subject matter of the invention, provision is made for effectuating cross spiraling so as to give a specimen a knurled surface. Knurled surfaces are very important from the standpoint of all handles requiring the maximum amount of friction at the gripped surfaces.

Where the cutters are adjustable respecting the obliquity of angle relative to the axis of the advancing specimen, the said cutters are changed in position while vertical shaft 99 is rotated so that spur wheel 100 engages the opposite threaded bar. Spur wheel 100 is forced to remain in engagement with the threaded bars by means of a removable compression plate 88. The reason why spur wheel 100 must engage the opposite threaded bar when cross spirals are to be cut is that the direction of rotation of live spindle 103 must be changed. When the cutter is at one angle, the direction of rotation of the specimen is clockwise, and when the cutter is at another angle for cross spirals, the direction of rotation is counterclockwise. As hereinbefore mentioned, the cutter must revolve toward the specimen fed to it.

Since the description herein is supported by drawings of a stationary cutter, means are provided for the revolution of the lathe frame supported on longitudinal supporting body 18 about flat circular table element 17a through the connecting head 19—20—21. Table element 17a is provided with calibrations on an edge thereof, said scale being designated by numeral 136a, the purpose thereof being to measure the necessary degrees of revolution for cross spiraling. Clamp 135 is loosened for rotating the lathe frame and then tightened to keep the same in its new position.

Although the many features of the main invention herein and the new assemblies have been described with great particularity and detail, we wish it understood that minor changes in construction and detail such as integrations, minor mechanical variations effecting the embodiment of the invention may be resorted to without departing from the spirit of the invention and the scope of the appended claims. We wish it understood also that minor adaptations for similar arts likewise may be resorted to within the spirit and scope of the invention.

We claim:

1. In a fluting and knurling machine having a fixed rotary cutter, the combination of a lathe carriage frame, a supporting body to which said carriage frame is pivotally connected, pivotal means adapted to regulate the vertical position of said lathe carriage frame relative to the rotary cutter, and tension means between the carriage frame and the pivotal means adapted to direct the carriage frame toward the fixed rotary cutter.

2. In a fluting and knurling machine having a fixed rotary cutter, the combination of a lathe carriage frame, a revolvable supporting body to which said carriage frame is pivotally connected, pivotal means adapted to regulate the vertical position of said lathe carriage frame relative to the rotary cutter, and tension means between the carriage frame and the pivotal means adapted to direct the carriage frame toward the fixed rotary cutter.

LOUIS GURRIERI.
SALVATORE GURRIERI.